United States Patent
Pinel et al.

(10) Patent No.: US 10,773,900 B1
(45) Date of Patent: Sep. 15, 2020

(54) OPTIMIZED ASSIGNMENT OF MULTIPLE CONVEYOR BELTS

(71) Applicant: INTERNATIONAL BUSINESS MACHINES CORPORATION, Armonk, NY (US)

(72) Inventors: Florian Pinel, New York, NY (US); Shikhar Kwatra, Durham, NC (US); Russell Patrick Bobbitt, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/354,583

(22) Filed: Mar. 15, 2019

(51) Int. Cl.
- *B65G 47/50* (2006.01)
- *B64F 1/36* (2017.01)
- *B65G 43/10* (2006.01)

(52) U.S. Cl.
CPC ............ *B65G 47/503* (2013.01); *B64F 1/368* (2013.01); *B65G 43/10* (2013.01); *B65G 2201/0235* (2013.01)

(58) Field of Classification Search
CPC .............................. B65G 47/503; B64F 1/368
See application file for complete search history.

(56) References Cited

U.S. PATENT DOCUMENTS 9,398,795 B2 * 7/2016 Gupta ................ G06Q 10/0833
10,507,975 B2 * 12/2019 Thomas ................ B65G 43/08
2010/0256805 A1 10/2010 Becker et al.
2013/0234849 A1 * 9/2013 Gupta ................ G06Q 10/0833
340/539.11
2015/0336753 A1 11/2015 Lykkegaard et al.
(Continued)

FOREIGN PATENT DOCUMENTS

CN 1695827 A 11/2005
CN 103578322 A 2/2014
(Continued)

OTHER PUBLICATIONS

COGNEX, "Optimal Assignment of Incoming Glights to Baggage Carousels at Airports," DTU Management Engineering Report, year 2013, pf. 1-24, Report No. 4.2013, Technical University of Denmark.*

(Continued)

*Primary Examiner* — Gene O Crawford
*Assistant Examiner* — Lester Ill Rushin
(74) *Attorney, Agent, or Firm* — Jordan T. Schiller

(57) ABSTRACT

A computer-implemented method for assigning one or more conveyor belts to convey a plurality of items. The computer-implemented method determines an availability of one or more conveyor belts, determines a quantity of a plurality of items to be loaded onto the one or more conveyor belts, and assigns the one or more conveyor belts to convey the plurality of items, based on the determined quantity of the plurality of items to be loaded onto the one or more conveyor belts. The computer-implemented method further tracks a location of each of the plurality of items on the assigned one or more conveyor belts, associates each of the plurality of items with a user, and directs the user to the one or more conveyor belts based on the tracked location of each of the plurality of items associated with the user.

17 Claims, 6 Drawing Sheets

(56) References Cited

U.S. PATENT DOCUMENTS

| | | | | |
|---|---|---|---|---|
| 2018/0096299 A1* | 4/2018 | Jarvis | ............... | G05D 1/0225 |
| 2018/0111698 A1* | 4/2018 | Podnar | ............... | B64F 1/368 |
| 2018/0127211 A1* | 5/2018 | Jarvis | ............... | G06Q 10/087 |
| 2018/0127212 A1* | 5/2018 | Jarvis | ............... | G05D 1/0234 |
| 2018/0204030 A1 | 7/2018 | Bruce et al. | | |
| 2018/0253683 A1* | 9/2018 | Taylor | ............... | G06Q 10/087 |
| 2020/0034608 A1* | 1/2020 | Nduka | ............... | G06F 21/32 |

FOREIGN PATENT DOCUMENTS

| | | | |
|---|---|---|---|
| CN | 107730119 A | 2/2018 | |
| KR | 101087757 B1 | 11/2011 | |
| KR | 101634501 B1 | 7/2016 | |

OTHER PUBLICATIONS

Barth, "Optimal Asignment of Incoming Flights to Baggage Carousels at Airports," DTU Management Engineering Report, 2013, p. 1-24, Report No. 4.2013, Technical University of Denmark.

COGNEX, "Airport Baggage Handling Identification Solutions," Airport Suppliers, p. 1-9, https://www.airport-suppliers.com/supplier/cognex-inc/, Accessed on Mar. 13, 2019.

Mell et al., "The NIST Definition of Cloud Computing," National Institute of Standards and Technology, Sep. 2011, p. 1-3, Special Publication 800-145.

Vincent et al., "Beyond the Carousel: Better Baggage Handling Through Enhanced Collaboration Among Airlines and Airports," IBM Global Business Services Report, 2007, p. 1-16, IBM Corporation.

* cited by examiner

OPTIMIZED ASSIGNMENT OF MULTIPLE CONVEYOR BELTS

BACKGROUND

The present disclosure relates generally to the field of cognitive computing, data processing, and more particularly to optimizing the assignment of conveyor belts to convey a plurality of items.

Travelers oftentimes need to check in baggage prior to getting into their seat, especially on airplane rides. After reaching a destination, checked-in baggage is removed from the underbelly of an airplane and driven to the baggage claim area of the airport where all of the removed baggage is typically placed on a conveyor belt that transports the baggage in a continuous loop on one of several baggage carousels.

Depending on the size of the airport, the size of the baggage carousel, and the number of checked-in baggage on the flight, more than one carousel may be required. Travelers, more often than not, need to alternate back and forth between various baggage carousels in the hopes of sighting their baggage and making a speedy exit out of the busy airport.

Some travelers may just hope that the airline did not lose their luggage and, quite often, exhale a sigh of relief when their baggage is spotted on the baggage carousel. This uncertainty and stress in locating one's baggage after a long journey can leave travelers dissatisfied and wary of the idea of traveling, and checking in baggage, in the first place.

BRIEF SUMMARY

Embodiments of the present disclosure disclose a method, a computer program product, and a system.

A method, according to an embodiment of the disclosure, in a data processing system including a processor and a memory, for implementing a program that assigns one or more conveyor belts to convey a plurality of items. The method includes determining an availability of one or more conveyor belts, determining a quantity of a plurality of items to be loaded onto the one or more conveyor belts, and assigning the one or more conveyor belts to convey the plurality of items, based on the determined quantity of the plurality of items to be loaded onto the one or more conveyor belts.

According to another embodiment, a computer program product for directing a computer processor to implement a program that assigns one or more conveyor belts to convey a plurality of items, is provided. The storage device embodies program code that is executable by a processor of a computer to perform a method. The method includes determining an availability of one or more conveyor belts, determining a quantity of a plurality of items to be loaded onto the one or more conveyor belts, and assigning the one or more conveyor belts to convey the plurality of items, based on the determined quantity of the plurality of items to be loaded onto the one or more conveyor belts.

According to another embodiment, a system for implementing a program that manages a device, includes one or more computer devices each having one or more processors and one or more tangible storage devices is provided. The one or more storage devices embody a program. The program has a set of program instructions for execution by the one or more processors. The program instructions include instructions for directing a computer processor to implement a program that assigns one or more conveyor belts to convey a plurality of items. The program instructions include instructions for determining an availability of one or more conveyor belts, determining a quantity of a plurality of items to be loaded onto the one or more conveyor belts, and assigning the one or more conveyor belts to convey the plurality of items, based on the determined quantity of the plurality of items to be loaded onto the one or more conveyor belts.

DETAILED DESCRIPTION

The present disclosure provides a solution for quickly and efficiently locating a user's baggage on a baggage carousel using computer vision, and notifying the user of the location of the baggage via text message and/or other methods as explained herein.

Currently, there are still problems and inconveniences associated with baggage retrieval at airports, and other public transportation venues. Firstly, the baggage carousel sizes are typically not commensurate with the amount of baggage that is being placed on them. For example, a large aircraft may only be afforded one small baggage carousel at the baggage claim area. In this scenario, multiple layers of baggage may be on a continuous loop, while being dangerous for a traveler to remove their bag for fear of another piece of baggage landing on their foot.

In other instances, two baggage carousels may be used to accommodate a large flight with a lot of checked-in baggage. However, travelers do not know which baggage carousel will be carrying their baggage, thus leaving the travelers eyeing both baggage carousels, back and forth, in the hopes of sighting their baggage.

The complexities and hassle of current baggage retrieval results in more travelers carrying larger bags with them onto the airplane, thus slowing down boarding and deplaning procedures.

Furthermore, long waiting times, crowded baggage claim areas, and missing or wrong baggage claim information can be very unsatisfying for travelers and airlines alike, not to mention give the airport an overall bad reputation.

The present disclosure proposes a baggage carousel management system that assigns one or more baggage carousels of various sizes to each flight arrival, based on the amount of checked-in baggage. Using surveillance cameras, the system tracks the baggage and the activity on each baggage carousel, optimizes the baggage carousel allocation for each arriving flight, and directs passengers to the correct baggage carousel using a mobile application.

Hereinafter, exemplary embodiments of the present invention will be described in detail with reference to the attached drawings.

The present disclosure is not limited to the exemplary embodiments below, but may be implemented with various modifications within the scope of the present disclosure. In addition, the drawings used herein are for purposes of illustration, and may not show actual dimensions.

Figure 1:
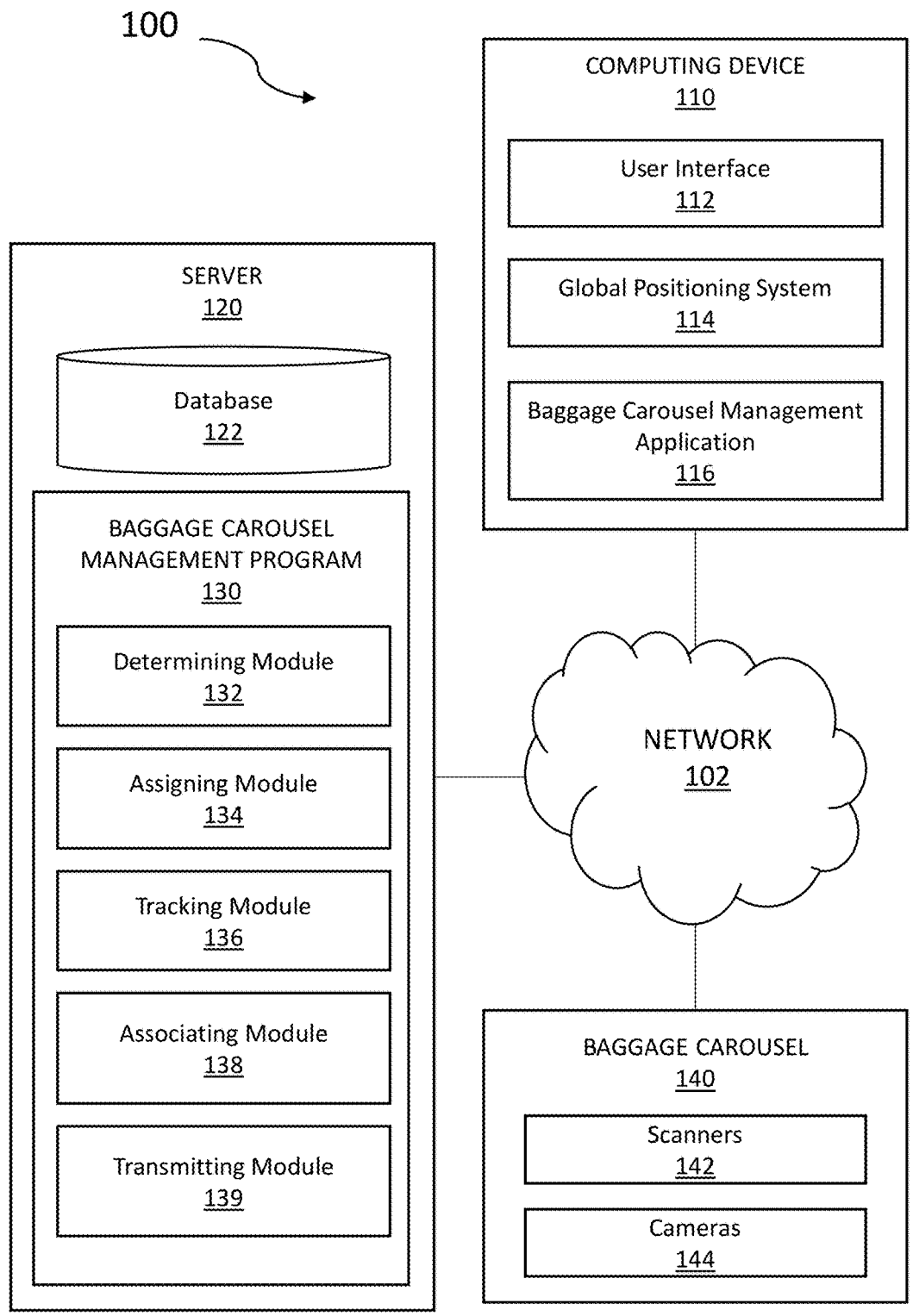
FIG. 1 illustrates a baggage carousel management computing environment, in accordance with an embodiment of the present disclosure.

FIG. 1 illustrates baggage carousel management computing environment 100, in accordance with an embodiment of the present disclosure. Carousel management computing environment 100 includes computing device 110, server 120, and baggage carousel 140, all connected via network 102. The setup in FIG. 1 represents an example embodiment configuration for the present invention, and is not limited to the depicted setup in order to derive benefit from the present invention.

In exemplary embodiments, computing device 110 includes user interface 112, Global Positioning System (GPS) 114, and baggage carousel management application 116. In various embodiments, computing device 110 may be a laptop computer, tablet computer, netbook computer, personal computer (PC), a desktop computer, a personal digital assistant (PDA), a smart phone, or any programmable electronic device capable of communicating with server 120, and baggage carousel 140, via network 102. Computing device 110 may include internal and external hardware components, as depicted and described in further detail below with reference to FIG. 4. In other embodiments, computing device 110 may be implemented in a cloud computing environment, as described in relation to FIGS. 5 and 6, herein. Computing device 110 may also have wireless connectivity capabilities allowing it to communicate with server 120, and baggage carousel 140, and other computers or servers over network 102.

In exemplary embodiments, computing device 110 includes user interface 112, which may be a computer program that allows a user to interact with computing device 110 and other connected devices via network 102. For example, user interface 112 may be a graphical user interface (GUI). In addition to comprising a computer program, user interface 112 may be connectively coupled to hardware components, such as those depicted in FIG. 4, for receiving user input. In exemplary embodiments, user interface 112 may be a web browser, however in other embodiments user interface 112 may be a different program capable of receiving user interaction and communicating with other devices.

In exemplary embodiments, GPS 114 may be a computer program on computing device 110 that provides time and location information of a user. Modern GPS systems operate on the concept of time and location. In modern GPS systems, four or more satellites broadcast a continuous signal detailing satellite identification information, time of transmission (TOT), and the precise location of the satellite at the time of transmission. When a GPS receiver picks up the signal, it determines the difference in time between the time of transmission (TOT) and the time of arrival (TOA). Based on the amount of time it took to receive the signals and the precise locations of the satellites when the signals were sent, GPS receivers are capable of determining the location where the signals were received. In exemplary embodiments, GPS 114 may be capable of providing real-time location detection of a user. For example, GPS 114 may be capable of providing a set of longitudinal and latitudinal coordinates of a user waiting for their baggage at a baggage carousel at the airport.

In exemplary embodiments, baggage carousel management application 116 may be a web browser or other computer program, on computing device 110, that is capable of receiving real-time data (e.g., baggage location data) from baggage carousel management program 130 and baggage carousel 140, via network 102. In alternative embodiments, baggage carousel management application 116 can transmit location information of a user in relation to a location of one or more pieces of baggage associated with a user, within a venue (e.g., airport, bus station, etc.).

With continued reference to FIG. 1, server 120 includes database 122 and baggage carousel management program 130, and may be a laptop computer, tablet computer, netbook computer, personal computer (PC), a desktop computer, a server, a personal digital assistant (PDA), a smart phone, or any programmable electronic device capable of communicating with computing device 110 and baggage carousel 140, via network 102. While server 120 is shown as a single device, in other embodiments, server 120 may be comprised of a cluster or plurality of computing devices, working together or working separately. In a preferred embodiment, server 120 may be implemented in a cloud computing environment, as described in relation to FIGS. 5 and 6, herein.

In an exemplary embodiment, database 122 may be a local storage on server 120 that contains the floorplans, or maps, for various transit venues, specifically with regards to depicting where a baggage claim area is located within the venue. For example, venue database 122 may include the floorplans, or map, for a train station, a bus station, an airport, a cruise ship loading station, and any venue where a traveler can locate a specific baggage claim area amongst many baggage carousels, within a venue.

In exemplary embodiments, database 122 is capable of being updated, dynamically, to provide a status, or location, of one or more items of baggage, based on information received from a user's computing device 110 (e.g., location of a user via GPS 114), baggage carousel 140 (e.g., location of a user's baggage), or by any other means of tracking an individual's location, and items of baggage belonging to the individual, and transmitting the location to baggage carousel management program 130, known to one of ordinary skill in the art. In exemplary embodiments, individuals must opt-in, and may opt-out at any time, to receive tracking information of themselves and/or their possessions.

In exemplary embodiments, database 122 may also store venue templates as data objects according to a type of venue (e.g., bus station, train station, airport, etc.), a corresponding route (e.g., 9 am express bus down Flatbush Ave; 10:15 am train shuttle from Penn Station to DC; 11 pm redeye flight from Chicago O'Hare to LAX), a transit venue name (e.g., well-known bus company, train company, or airline), a specific user as identified by a seat number (e.g., seat 34B on Flight 123), number of baggage checked-in by user (e.g., User A, 2 baggageChecked), or any other category or organization deemed most useful for the invention to be utilized. For example, a venue data object may be stored as <airlineX, 9:15 am, Flight 123, LAX, seat 34B, 2 baggageChecked>.

In various embodiments, database 122 can be stored on server 120, computing device 110, or baggage carousel management program 130, as a separate database.

In an exemplary embodiment, baggage carousel management program 130 contains instruction sets, executable by a processor, which may be described using a set of functional modules. The functional modules of baggage carousel management program 130 may include determining module 132, assigning module 134, tracking module 136, associating module 138, and transmitting module 139.

With continued reference to FIG. 1, baggage carousel 140 includes scanners 142 and cameras 144, and may comprise one or more conveyor belts that can convey a plurality of items from one location to another. In exemplary embodiments, the one or more conveyor belts are one or more baggage carousels in an airport and the plurality of items are baggage.

In exemplary embodiments, baggage carousel management program 130 communicates the carousel assignments to a baggage trolley driver (i.e., computing device 110) at the airport, over network 102, and the arriving baggage is then transferred to the assigned baggage carousels. Various factors can determine which baggage carousel 140 is assigned, as discussed further herein.

In exemplary embodiments, the baggage loading zone on each baggage carousel 140, as well as one or more points on the baggage carousel 140 loop, are equipped with one or more scanners 142, cameras 144, and/or other devices known to one of ordinary skill in the art, that use computer vision to count the pieces of baggage on the baggage carousel 140, scan baggage tags for each piece of baggage, and check whether more pieces of baggage are still being loaded onto the baggage carousel 140.

In exemplary embodiments, scanners 142 may be a computer program or device, on baggage carousel 140, that can read and output printed barcodes, near field communication (NFC) tags, or quick response (QR) codes, such as a baggage barcode label, baggage NFC tag, and/or baggage QR code, to a computing device, such as server 120 or computing device 110. In an exemplary embodiment, checked-in baggage by a user may include a barcode label that is scanned upon loading onto a baggage carousel 140. Scanners 142 are not limited to the technology described herein, however, and may include other types of scanning and tracking technology known to one of ordinary skill in the art.

In various embodiments, scanners 142 may be set up at equidistant points along a baggage carousel 140 route. At the various points where the scanner 142 is located, individual pieces of baggage (containing barcode labels, NFC tag, QR code, etc.) may be scanned, and the information is dynamically updated to reflect a location of the particular bag along the baggage carousel 140 route. This location information may then be transmitted to baggage carousel management application 116, via network 102.

In exemplary embodiments, cameras 144 may include devices capable of recording moving objects along a baggage carousel 140 route, in accordance with embodiments of the present disclosure. In exemplary embodiments, cameras 144 installed along the baggage carousel 140 route, from airplane to baggage claim area in the airport, are capable of constructing a feature set in real-time for each piece of baggage using video analytics software, such as IBM® Intelligent Video Analytics (all IBM-based trademarks and logos are trademarks or registered trademarks of International Business Machines Corporation and/or its affiliates).

In alternative embodiments, cameras 144 installed along a passenger route from the airplane to the baggage claim area at the airport, together with video analytics software, can be leveraged to develop feature sets that encode the identity of individual passengers to enable subsequent identification of these passengers from different perspectives (e.g., facial features, gender, age, clothing, height, etc.). In this fashion, baggage carousel management program 130 may better identify an individual waiting for their baggage at a baggage carousel 140, thereby directing the individual to a correct baggage location. In exemplary embodiments, individuals must opt-in, and may opt-out at any time, prior to any tracking or location information of a user and/or their possessions is obtained.

In exemplary embodiments, cameras 144 are also installed inside a baggage claim area, overlooking baggage carousels 140. Depending on the characteristics and capabilities of cameras 144, together with the layout design of baggage carousels 140, one camera 144 may be capable of spanning multiple baggage carousels 140. As loaded baggage on baggage carousel 140, and passengers, travel along their respective routes towards the baggage claim area, the baggage and passengers are detected by cameras 144 and corresponding feature sets are acquired in real time. The location of the individual passengers and baggage are continually updated, in accordance with embodiments of the present disclosure, and this information is used to help the individual passengers find his/her baggage via a mobile application (i.e., baggage carousel management application 116) on computing device 110. In alternative embodiments, a user location may be obtained via GPS 114 on the user's computing device 110.

In exemplary embodiments, each of the one or more conveyor belts (i.e., baggage carousel 140) are equipped with a plurality of scanners 142 and/or cameras 144 to perform at least one of the following functions: scanning a tag on each of the plurality of items (i.e., baggage), wherein the tag on each of the plurality of items is associated with a user; and providing real-time images of each of the plurality of items.

In alternative embodiments, scanners 142 may communicate with one or more pieces of baggage on baggage carousel 140 via Bluetooth® (Bluetooth and all Bluetooth—based trademarks and logos are trademarks or registered trademarks of Bluetooth SIG, Inc. and/or its affiliates), Wireless Fidelity (WiFi), Radio-Frequency Identification (RFID), and any other wireless radio communication standard known to one of ordinary skill in the art. In further embodiments, information associated with one or more pieces of scanned baggage (e.g., owner's name, flight number, origination airport, number of other checked-in baggage belonging to same user, etc.) may be transmitted to baggage carousel management program 130, over network 102.

With continued reference to FIG. 1, baggage carousel management program 130, in an exemplary embodiment, may be a computer application on server 120 that contains instruction sets, executable by a processor. The instruction sets may be described using a set of functional modules. In exemplary embodiments, baggage carousel management program 130 may receive input from baggage carousel 140 and computing device 110, over network 102. In alternative embodiments, baggage carousel management program 130 may be a computer application contained within baggage carousel 140, or as a standalone program on a separate electronic device.

With continued reference to FIG. 1, the functional modules of baggage carousel management program 130 include determining module 132, assigning module 134, tracking module 136, associating module 138, and transmitting module 139.

Figure 2:
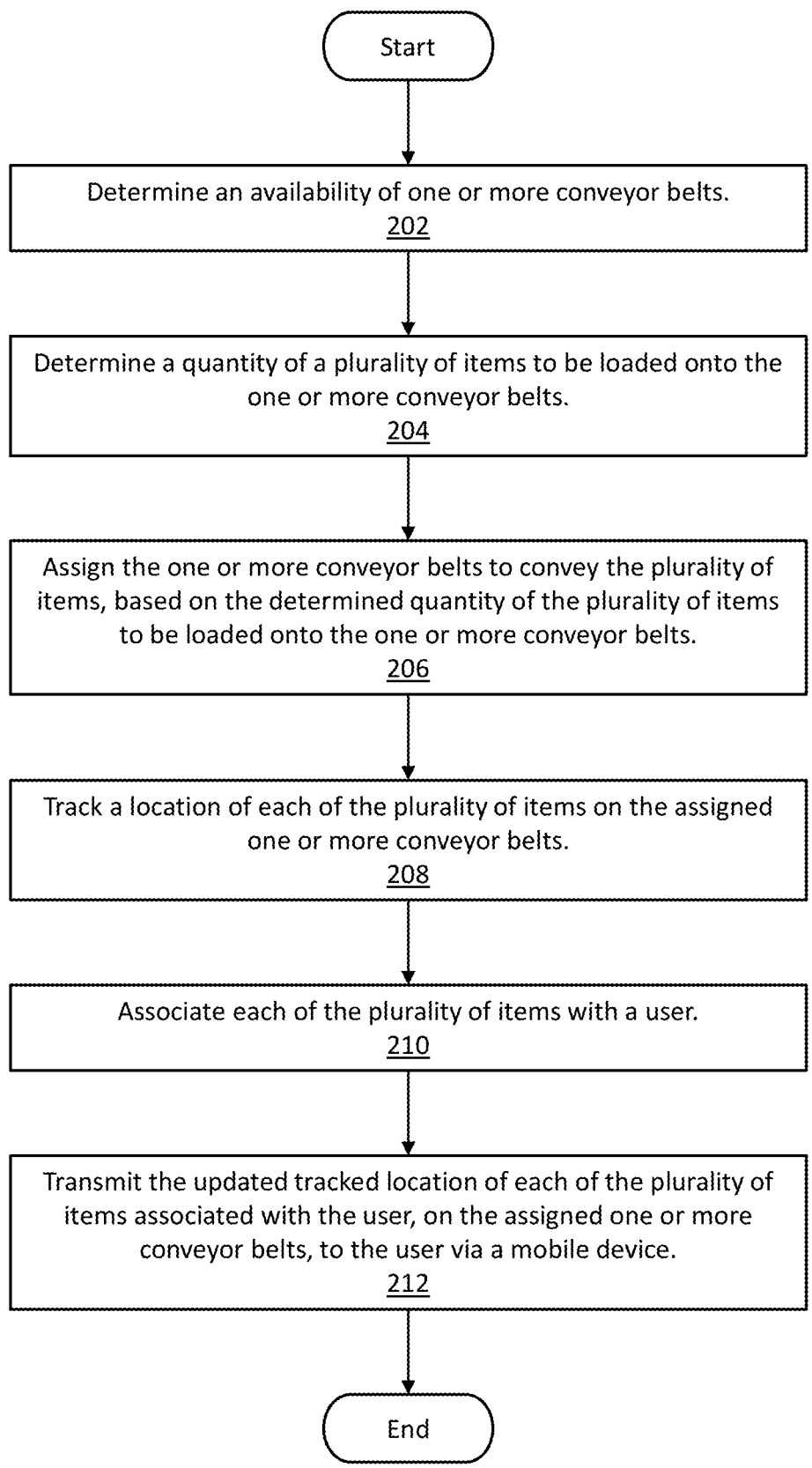
FIG. 2 is a flowchart illustrating the operation of the baggage carousel management program, in accordance with an embodiment of the present disclosure.

FIG. 2 is a flowchart illustrating the operation of baggage carousel management program 130 of FIG. 1, in accordance with embodiments of the present disclosure.

With reference to FIGS. 1 and 2, determining module 132 includes a set of programming instructions, in baggage carousel management program 130, to determine an availability of one or more conveyor belts (step 202). The set of programming instructions is executable by a processor.

In exemplary embodiments, the one or more conveyor belts are one or more baggage carousels at an airport. In alternative embodiments, the one or more conveyor belts may be baggage carousels at a bus station or any other public venue used to convey baggage from one location to another. In further alternative embodiments, the one or more conveyor belts may be found in warehouses (e.g., shipping centers, receiving docks, etc.) or any other venue used to convey items from one location to another.

In exemplary embodiments, determining module 132 further includes a set of programming instructions, in baggage carousel management program 130, to determine a quantity of a plurality of items to be loaded onto the one or more conveyor belts (step 204). The set of programming instructions is executable by a processor.

In exemplary embodiments, the plurality of items are baggage. In alternative embodiments, the plurality of items may be any product, or item (e.g., boxes, envelopes, etc.).

In exemplary embodiments, determining module 132 receives data from baggage carousel management application 116 or database 122, which may include information for an arrival flight such as an arrival time, a number of passengers on the arrival flight, a number of checked-in baggage to be loaded onto the one or more baggage carousels upon arrival, origination airport, arrival airport, number of baggage carousels at a given airport, and any other relevant information that may be helpful for baggage carousel management program 130 to determine a quantity of a plurality of items to be loaded onto the one or more baggage carousels.

In exemplary embodiments, determining module 132 is capable of assessing current usage of the one or more baggage carousels, and determining a number of baggage carousels 140 to be assigned to the arrival flight, based on the number of baggage to be loaded, and the assessed current usage of the one or more baggage carousels 140.

In exemplary embodiments, baggage carousel management program 130 assesses current baggage carousel usage by utilizing one or more predictive models (i.e., machine learning or other analytical models) to estimate a time for a first baggage pickup for the arrival flight and a last baggage pickup for the arrival flight at a baggage carousel 140, and a distribution of baggage pickups for the arrival flight, at the baggage carousel 140.

For example, machine learning or other analytical models are created to predict, for a given flight, the time interval between landing and the first baggage pickup; the time interval between the first and last baggage pickup; and the distribution of the baggage pickups over time (e.g., by modeling the distribution as a standard distribution and predicting the mean and standard deviation).

In exemplary embodiments, the one or more parameters used by the one or more predictive models may include at least one of the following: a time of day of arrival flight; a distance between arrival gate and baggage claim area; airport congestion at time of arrival flight; a number of baggage on an arrival flight; a number of passengers on an arrival flight; and an estimated crowd at passport control at time of arrival flight.

In exemplary embodiments, the one or more baggage carousels 140 may be of various sizes and dimensions. For example, baggage carousel "A" at an airport may only be able to hold 100 pieces of baggage, while baggage carousel "B" may be capable of holding 300 pieces of baggage. By determining the availability of various one or more baggage carousels 140 at a venue, determining module 132 makes effective use of the resources available in order to provide a more seamless and satisfactory experience for travelers.

With reference to an illustrative example, Joe is arriving at a busy international airport in New York City on packed Flight 123 carrying 500 passengers. The busy international airport has 15 baggage carousels located in the baggage claim area for the particular airline that Joe is on. Joe has a driver waiting to pick him up and Joe is concerned that he will be waiting a long time in order to retrieve his baggage from the baggage claim area. Joe has had multiple bad experiences with airlines losing his luggage, standing for lengthy periods of time at the incorrect baggage carousel, and not recognizing his luggage through multiple loops around the baggage carousel. In the present disclosure, baggage carousel management program 130 may alleviate Joe's concerns and rather, make the experience of luggage retrieval at the baggage carousel more expeditious and seamless. In Joe's scenario, determining module 132 determines that baggage carousels "A" and "B" are available at the time of Flight 123's arrival, and are sufficient to hold all of the checked-in baggage of the 500 passengers on Flight 123.

With continued reference to FIGS. 1 and 2, assigning module 134 includes a set of programming instructions, in baggage carousel management program 130, to assign the one or more conveyor belts to convey the plurality of items, based on the determined quantity of the plurality of items to be loaded onto the one or more conveyor belts (step 206). The set of programming instructions is executable by a processor.

In exemplary embodiments, assigning module 134 communicates with baggage carousel 140 over network 102, and assigns the available one or more baggage carousels 140 that are capable of conveying the number of checked-in baggage on an arrival flight.

In alternative embodiments, assigning module 134 can generate all possible baggage carousel assignments for scheduled arrival flights, on a given day, and choose the option that optimizes certain constraints (e.g., pick up time, etc.).

In exemplary embodiments, assigning module 134 communicates the baggage carousel 140 assignments to a baggage trolley driver, and unloaded baggage is then transferred to the assigned baggage carousels 140.

With continued reference to the illustrative example above, assigning module 134 assigns baggage carousels "A" and "B" to Flight 123, since they are currently not in use and are sufficient to hold all of the checked-in baggage of the 500 passengers on Flight 123. By assigning baggage carousels "A" and "B" to Flight 123's arrival, assigning module 134 adheres to the machine learning models for first baggage pickup and last baggage pickup at baggage carousels "A" and "B", and therefore does not assign baggage carousels "A" and "B" to any other arrival flights until determining module 132 determines baggage carousels "A" and "B" availability once again.

With continued reference to FIGS. 1 and 2, tracking module 136 includes a set of programming instructions in baggage carousel management program 130, to track a location of each of the plurality of items on the assigned one or more conveyor belts (step 208). The set of programming instructions is executable by a processor.

In exemplary embodiments, each of the one or more conveyor belts (i.e., baggage carousel 140) are equipped with a plurality of scanners 142 and/or cameras 144 to perform at least one of the following functions: scanning a tag on each of the plurality of items (i.e., baggage), wherein the tag on each of the plurality of items is associated with a user; and providing real-time images of each of the plurality of items.

In exemplary embodiments, tracking module 136 utilizes the scanners 142 and cameras 144 associated with baggage carousel 140, in order to track a location for each of the pieces of baggage loaded onto baggage carousel 140 for a particular arrival flight, in accordance with embodiments of the present disclosure. Tracking module 136, in exemplary embodiments, updates, continuously, the tracked location of each of the plurality of items (i.e., baggage) associated with the user, in real-time.

In exemplary embodiments, every time a piece of baggage is loaded onto the baggage carousel 140, it is scanned by scanners 142. The information associated with the barcode on each piece of baggage is then transmitted to baggage carousel management program 130, via network 102. Cameras 144 installed on baggage carousel 140 track each piece of baggage at each loop around the baggage carousel 140. Additionally, if baggage carousel management program 130 knows the shape of the baggage carousel 140, as retrieved in database 122, it can use the time it takes for a piece of baggage to complete a full loop in order to estimate a piece of baggage's position on the baggage carousel 140 at any given moment.

With continued reference to the illustrative example above, Joe exits the airplane and walks toward baggage claim to retrieve his baggage at baggage carousel 140. Tracking module 136 tracks Joe's baggage as it gets loaded onto baggage carousel 140. Joe's baggage is scanned by scanners 142 on baggage carousel 140, thereby identifying the baggage as belonging to Joe. Cameras 144 along baggage carousel 140 then track the identified baggage on its route along baggage carousel 140.

In alternative embodiments, priority baggage and their respective owners (e.g., first class passengers, sky rewards members, etc.) can be handled differently (i.e., separate machine learning models, separate time estimates, separate baggage carousel assignments) for more expeditious service.

With continued reference to FIGS. 1 and 2, associating module 138 includes a set of programming instructions in baggage carousel management program 130, to associate each of the plurality of items with a user (step 210). The set of programming instructions is executable by a processor.

In exemplary embodiments, associating module 138 can associate baggage feature sets with individual passengers, thus enabling baggage carousel management program 130 to identify and track individual pieces of baggage belonging to specific passengers. In exemplary embodiments, individuals may elect to opt-in and opt-out of baggage tracking, via baggage carousel management application 116, given proper disclosure and consent.

In exemplary embodiments, associating module 138 can direct the user (e.g., passenger) to the one or more conveyor belts (i.e., baggage carousel) based on the tracked location of each of the plurality of items (i.e., baggage) associated with the user.

With continued reference to FIGS. 1 and 2, transmitting module 139 includes a set of programming instructions in baggage carousel management program 130, to transmit the updated tracked location of each of the plurality of items associated with the user, on the assigned one or more conveyor belts, to the user via a mobile device (step 212). The set of programming instructions is executable by a processor.

In exemplary embodiments, transmitting module 139 can transmit the updated tracked location of each of the plurality of items associated with the user, on the assigned one or more conveyor belts, to the user via a mobile device (e.g., computing device 110) in various ways.

Figure 3:
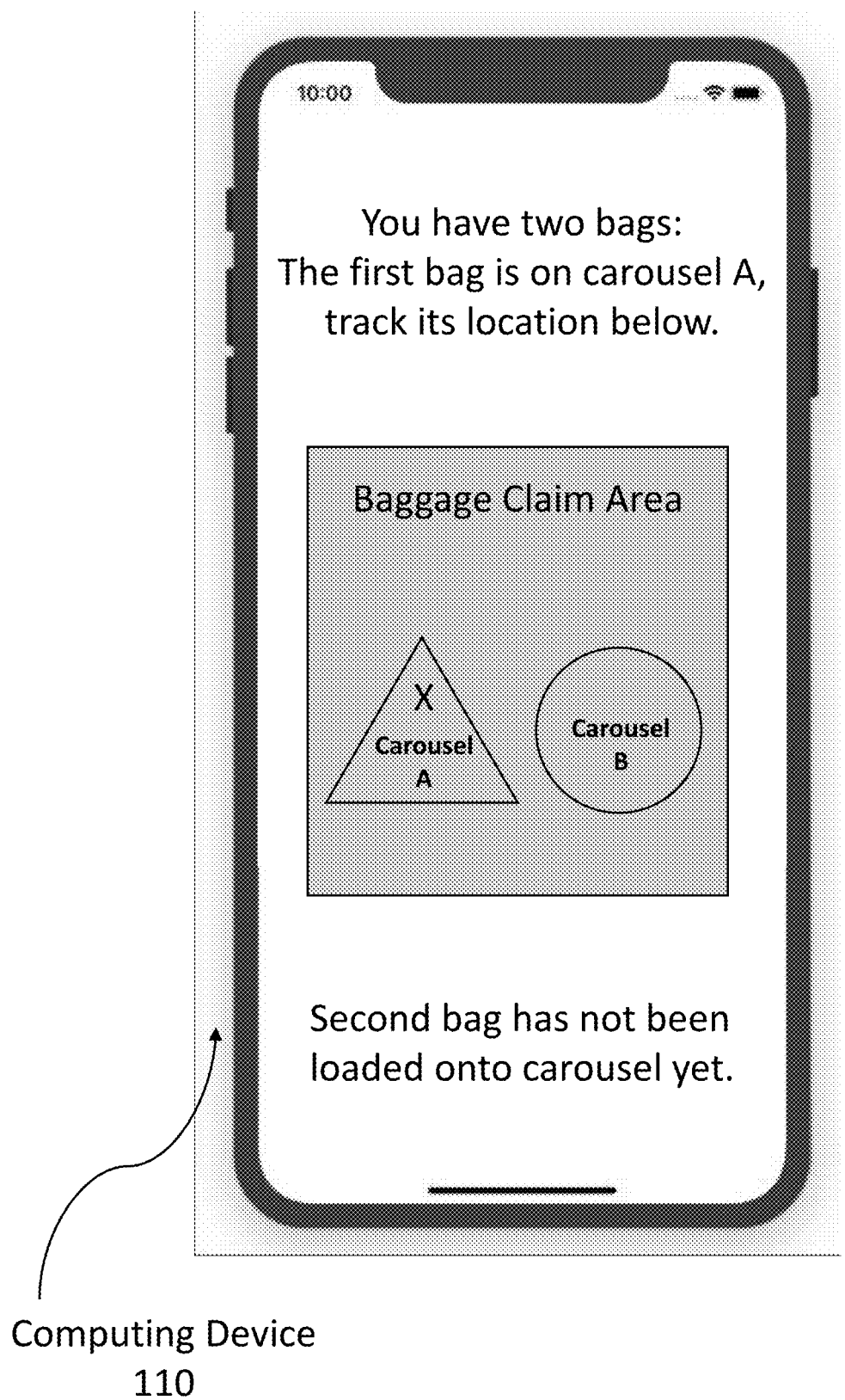
FIG. 3 is an illustrative example of a message that a user receives on a mobile device depicting a location, in real-time, of a user's baggage on a baggage carousel, in accordance with an embodiment of the present disclosure.

FIG. 3 is an illustrative example of a message that a user receives on a mobile device depicting a location, in real-time, of a user's baggage on a baggage carousel, in accordance with an embodiment of the present disclosure.

With reference to FIGS. 1 and 3, transmitting module 139 may send an updated text message to the computing device 110 of the user indicating a location of the baggage of the user. For example, transmitting module 139 may send an image of the baggage carousel 140 and the user's baggage location on the baggage carousel 140 in real-time, with continuous updates that refresh the image depicting the location of a user's baggage on baggage carousel 140, in accordance with the image displayed in FIG. 3.

In FIG. 3, computing device 110 receives a message from baggage carousel management application 116 indicating to the user that "You have two bags: The first bag is on carousel A, track its location below" and "Second bag has not been loaded onto carousel yet." Carousel A, therefore, includes an "X" indicating that the first bag has arrived there.

In alternative embodiments, transmitting module 139 can activate a vibration or sound frequency on a user's computing device 110 (e.g., mobile device) in proportion to a distance between the user and each of the plurality of items associated with the user (i.e., baggage). For example, the closer the user gets to his/her baggage on baggage carousel 140, the higher the vibration frequency (or faster the repetitive sound becomes) on the user's computing device 110.

In further embodiments, transmitting module 139 can activate a voice prompt on a user's computing device 110 to provide directions to each of the plurality of items (i.e., baggage) associated with the user.

In further alternative embodiments, transmitting module 139 may further include a virtual reality (VR) headset integration that a user wears. While wearing the VR headset, a user would see the baggage carousel 140 overlaid with helpful graphical cues (e.g., a big arrow that points to the user's baggage) to more easily point out and find his/her baggage.

With continued reference to the illustrative example above, Joe arrives at the baggage claim area and receives an image on his mobile device, via baggage carousel management application 116, that depicts a real-time location of his two pieces of baggage on baggage carousel 140. Joe patiently awaits for the baggage carousel 140 to loop around until he is able to expeditiously retrieve his baggage.

In additional embodiments, baggage carousel management program 130 may gather baggage tracking information, together with individual user tracking information, in order to facilitate real-time interventions (e.g., an airport agent is dispatched if a passenger has been in the baggage claim area for more than 30 minutes) and longer-term improvements to operation (e.g., trends can be analyzed to inform modification to baggage transporting process). In all embodiments, any collected user data is only conducted on a user opt-in process, after full disclosure and consent by the user.

In the example embodiment, network 102 is a communication channel capable of transferring data between connected devices and may be a telecommunications network used to facilitate telephone calls between two or more parties comprising a landline network, a wireless network, a closed network, a satellite network, or any combination thereof. In another embodiment, network 102 may be the Internet, representing a worldwide collection of networks and gateways to support communications between devices connected to the Internet. In this other embodiment, network 102 may include, for example, wired, wireless, or fiber optic connections which may be implemented as an intranet network, a local area network (LAN), a wide area network (WAN), or any combination thereof. In further embodiments, network 102 may be a Bluetooth network, a WiFi network, or a combination thereof. In general, network 102 can be any combination of connections and protocols that will support communications between computing device 110, server 120, and baggage carousel 140.

Figure 4:
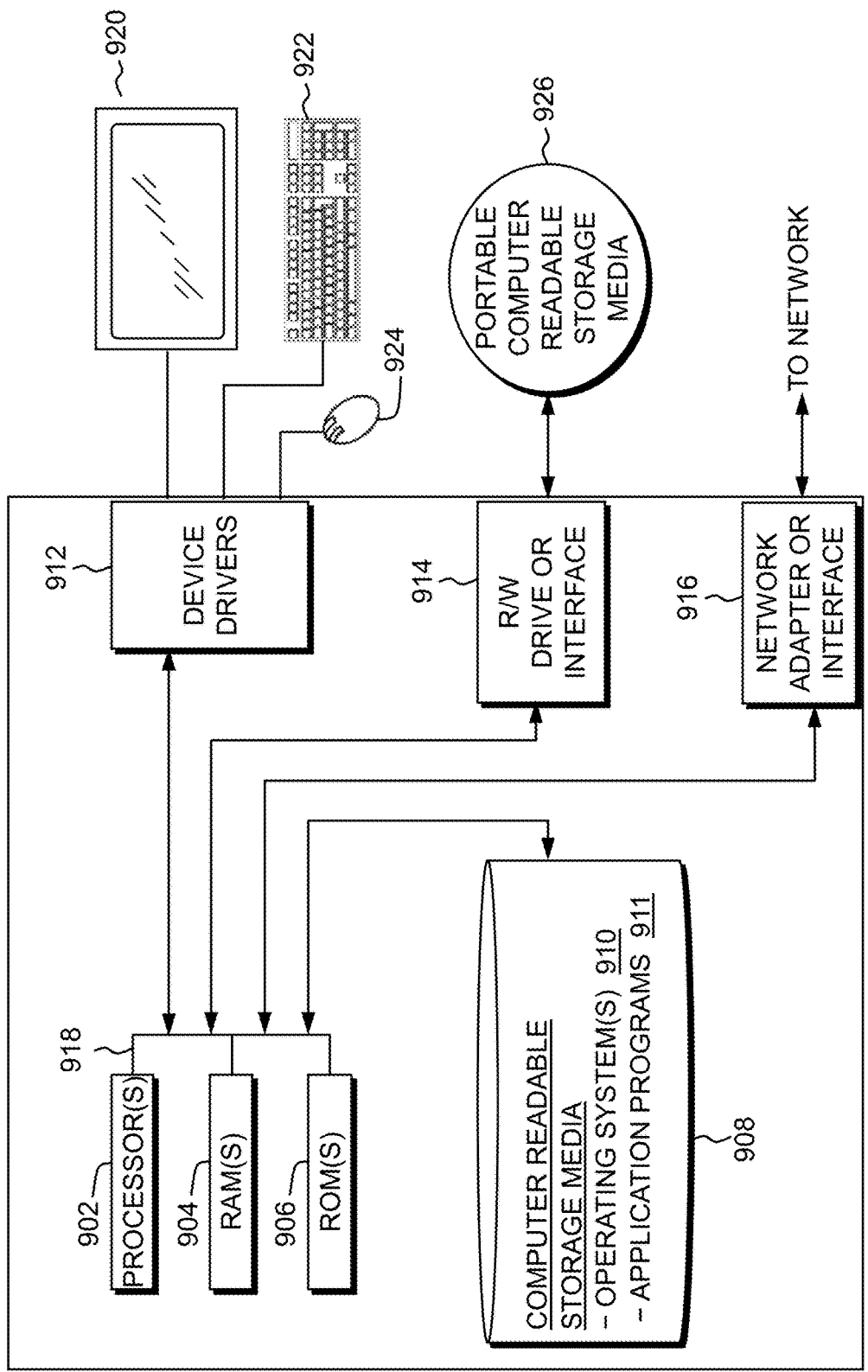
FIG. 4 is a diagram graphically illustrating the hardware components of a baggage carousel management computing environment, in accordance with an embodiment of the present disclosure.

FIG. 4 is a block diagram depicting components of a computing device (such as computing device 110 as shown in FIG. 1), in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Computing device may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, such as baggage carousel management program 130, may be stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device may also include a R/W drive or interface 914 to read from and write to one or more portable computer readable storage media 926. Application programs 911 on computing device may be stored on one or more of the portable computer readable storage media 926, read via the respective R/W drive or interface 914 and loaded into the respective computer readable storage media 908.

Computing device may also include a network adapter or interface 916, such as a TCP/IP adapter card or wireless communication adapter (such as a 4G wireless communication adapter using OFDMA technology). Application programs 911 on computing device may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Computing device may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914, and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
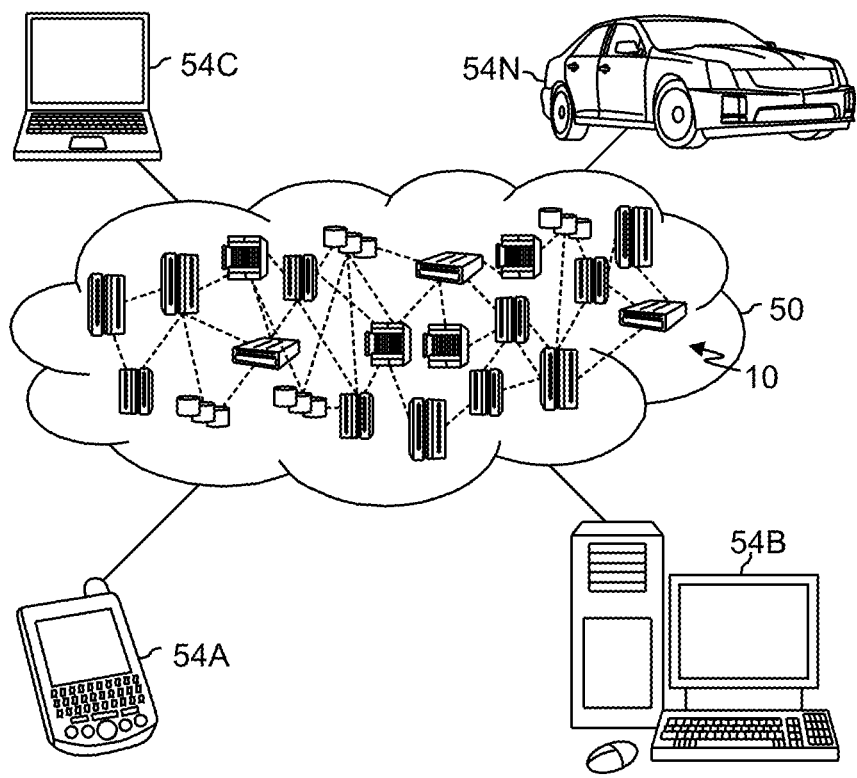
FIG. 5 depicts a cloud computing environment, in accordance with an embodiment of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
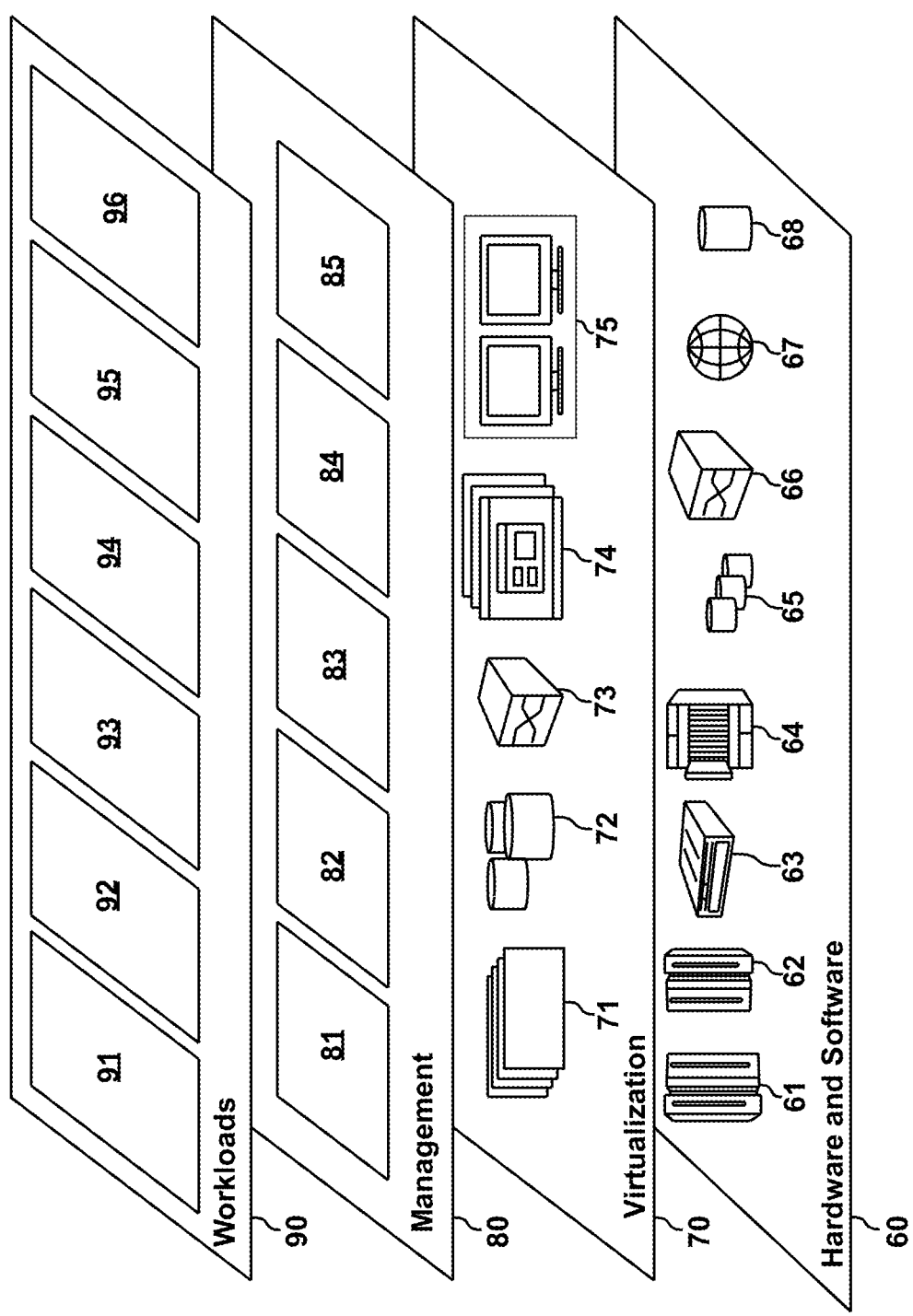
FIG. 6 depicts abstraction model layers of the illustrative cloud computing environment, in accordance with an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and controlling access to data objects 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed. However, numerous modifications and substitutions can be made without deviating from the scope of the present invention. Therefore, the present invention has been disclosed by way of example and not limitation.

The invention claimed is:

1. A computer-implemented method for assigning one or more conveyor belts to convey a plurality of items, the method comprising:
   determining an availability of one or more conveyor belts;
   determining a quantity of a plurality of items to be loaded onto the one or more conveyor belts;
   assigning the one or more conveyor belts to convey the plurality of items, based on the determined quantity of the plurality of items to be loaded onto the one or more conveyor belts;

tracking a location of each of the plurality of items on the assigned one or more conveyor belts;

associating each of the plurality of items with a user; and directing the user to the one or more conveyor belts based on the tracked location of each of the plurality of items associated with the user.

2. The computer-implemented method of claim 1, wherein each of the one or more conveyor belts are equipped with a plurality of scanners to perform at least one of the following functions: scanning a tag on each of the plurality of items, wherein the tag on each of the plurality of items is associated with a user; and providing real-time images of each of the plurality of items.

3. The computer-implemented method of claim 1, further comprising:

updating the tracked location of each of the plurality of items associated with the user, in real-time;

transmitting the updated tracked location of each of the plurality of items associated with the user, on the assigned one or more conveyor belts, to the user via a mobile device.

4. The computer-implemented method of claim 3, wherein transmitting the updated tracked location of each of the plurality of items associated with the user, on the assigned one or more conveyor belts, to the user via a mobile device comprises at least one of the following: an updated text message to the mobile device; a vibration frequency in proportion to a distance between the user and each of the plurality of items associated with the user; a voice prompt to provide directions to each of the plurality of items associated with the user, and a virtual reality (VR) headset integration that points out each of the plurality of items associated with the user, on the assigned one or more conveyor belts.

5. The computer-implemented method of claim 1, wherein the one or more conveyor belts are one or more baggage carousels in an airport and the plurality of items are baggage.

6. The computer-implemented method of claim 5, further comprising:

receiving information for an arrival flight, wherein the received information comprises at least one of the following: a landing time, a number of passengers on the arrival flight, and a number of baggage to be loaded onto the one or more baggage carousels upon arrival;

assessing current usage of the one or more baggage carousels;

determining a number of baggage carousels to be assigned to the arrival flight, based on the number of baggage to be loaded, and the assessed current usage of the one or more baggage carousels; and assigning one or more available baggage carousels to the arrival flight.

7. The computer-implemented method of claim 6, wherein assigning one or more available baggage carousels to the arrival flight further comprises:

using one or more predictive models to estimate a time for a first baggage pickup for the arrival flight and a last baggage pickup for the arrival flight, together with a distribution of baggage pickups, for the arrival flight.

8. The computer-implemented method of claim 7, wherein one or more parameters used by the one or more predictive models comprise at least one of the following: a time of day, a distance between arrival gate and baggage claim area, airport congestion, a number of baggage, a number of passengers, an arrival flight origin, and an estimated crowd at passport control.

9. A computer program product, comprising a non-transitory tangible storage device having program code embodied therewith, the program code executable by a processor of a computer to perform a method, the method comprising:

determining an availability of one or more conveyor belts;

determining a quantity of a plurality of items to be loaded onto the one or more conveyor belts;

assigning the one or more conveyor belts to convey the plurality of items, based on the determined quantity of the plurality of items to be loaded onto the one or more conveyor belts;

tracking a location of each of the plurality of items on the assigned one or more conveyor belts;

associating each of the plurality of items with a user; and directing the user to the one or more conveyor belts based on the tracked location of each of the plurality of items associated with the user.

10. The computer program product of claim 9, wherein each of the one or more conveyor belts are equipped with a plurality of scanners to perform at least one of the following functions: scanning a tag on each of the plurality of items, wherein the tag on each of the plurality of items is associated with a user; and providing real-time images of each of the plurality of items.

11. The computer program product of claim 9, further comprising:

updating the tracked location of each of the plurality of items associated with the user, in real-time;

transmitting the updated tracked location of each of the plurality of items associated with the user, on the assigned one or more conveyor belts, to the user via a mobile device.

12. The computer program product of claim 11, wherein transmitting the updated tracked location of each of the plurality of items associated with the user, on the assigned one or more conveyor belts, to the user via a mobile device comprises at least one of the following: an updated text message to the mobile device; a vibration frequency in proportion to a distance between the user and each of the plurality of items associated with the user; a voice prompt to provide directions to each of the plurality of items associated with the user, and a virtual reality (VR) headset integration that points out each of the plurality of items associated with the user, on the assigned one or more conveyor belts.

13. The computer program product of claim 9, wherein the one or more conveyor belts are one or more baggage carousels in an airport and the plurality of items are baggage.

14. A computer system, comprising:

one or more computer devices each having one or more processors and one or more tangible storage devices; and a program embodied on at least one of the one or more storage devices, the program having a plurality of program instructions for execution by the one or more processors, the program instructions comprising instructions for:

determining an availability of one or more conveyor belts;

determining a quantity of a plurality of items to be loaded onto the one or more conveyor belts;

assigning the one or more conveyor belts to convey the plurality of items, based on the determined quantity of the plurality of items to be loaded onto the one or more conveyor belts;

tracking a location of each of the plurality of items on the assigned one or more conveyor belts;

associating each of the plurality of items with a user; and directing the user to the one or more conveyor belts based on the tracked location of each of the plurality of items associated with the user.

15. The computer system of claim 14, wherein each of the one or more conveyor belts are equipped with a plurality of scanners to perform at least one of the following functions: scanning a tag on each of the plurality of items, wherein the tag on each of the plurality of items is associated with a user; and providing real-time images of each of the plurality of items.

16. The computer system of claim 14, further comprising:
updating the tracked location of each of the plurality of items associated with the user, in real-time;
transmitting the updated tracked location of each of the plurality of items associated with the user, on the assigned one or more conveyor belts, to the user via a mobile device.

17. The computer system of claim 16, wherein transmitting the updated tracked location of each of the plurality of items associated with the user, on the assigned one or more conveyor belts, to the user via a mobile device comprises at least one of the following: an updated text message to the mobile device; a vibration frequency in proportion to a distance between the user and each of the plurality of items associated with the user; a voice prompt to provide directions to each of the plurality of items associated with the user, and a virtual reality (VR) headset integration that points out each of the plurality of items associated with the user, on the assigned one or more conveyor belts.

* * * * *